United States Patent [19]

Frye

[11] Patent Number: 4,942,071
[45] Date of Patent: Jul. 17, 1990

[54] ADHESIVE HOLDING DEVICE WITH SEPARABLE ELEMENTS

[76] Inventor: Bruce J. Frye, P.O. Box 483, Milltown, Wis. 54858

[21] Appl. No.: 425,469

[22] Filed: Oct. 23, 1989

[51] Int. Cl.$^5$ .............................................. B32B 7/06
[52] U.S. Cl. .................... 428/40; 428/317.1; 428/317.3; 428/319.9; 428/354; 248/205.3
[58] Field of Search ............... 428/40, 317, 3, 317.1, 428/319.9, 354; 248/205.3, 467

[56] References Cited

U.S. PATENT DOCUMENTS

| 3,098,272 | 7/1963 | Frye | 24/67 |
|---|---|---|---|
| 3,241,795 | 3/1966 | Frye | 248/28 |
| 3,311,339 | 3/1967 | Frye | 248/205 |
| 3,325,083 | 6/1967 | Frye | 229/62 |
| 3,856,249 | 12/1974 | Frye | 248/205 |
| 4,003,538 | 1/1977 | Frye | 248/467 |
| 4,310,137 | 1/1982 | Frye | 248/467 |
| 4,442,617 | 4/1984 | Frye et al. | 40/152.1 |
| 4,756,498 | 7/1988 | Frye | 248/205 |

*Primary Examiner*—Alexander S. Thomas
*Attorney, Agent, or Firm*—Kinney & Lange

[57] ABSTRACT

An adhesive holding device for fastening a flat rigid back surface of an object to a relatively rough flat wall includes a first sheet of PVC having an outwardly facing surface covered with pressure sensitive adhesive material affixed to the object, a relatively thick, resilient, compressible, flat pad affixed to the wall, and a second sheet of relatively thin, flexible material affixed to the outwardly facing surface of the pad. An outwardly facing surface of the second sheet is mutually adhered to the inwardly facing surface of the first sheet. To remove the object from the wall without damage to either, the object is forced away from the wall to break the mutual adhering forces between the first and second sheets.

12 Claims, 3 Drawing Sheets

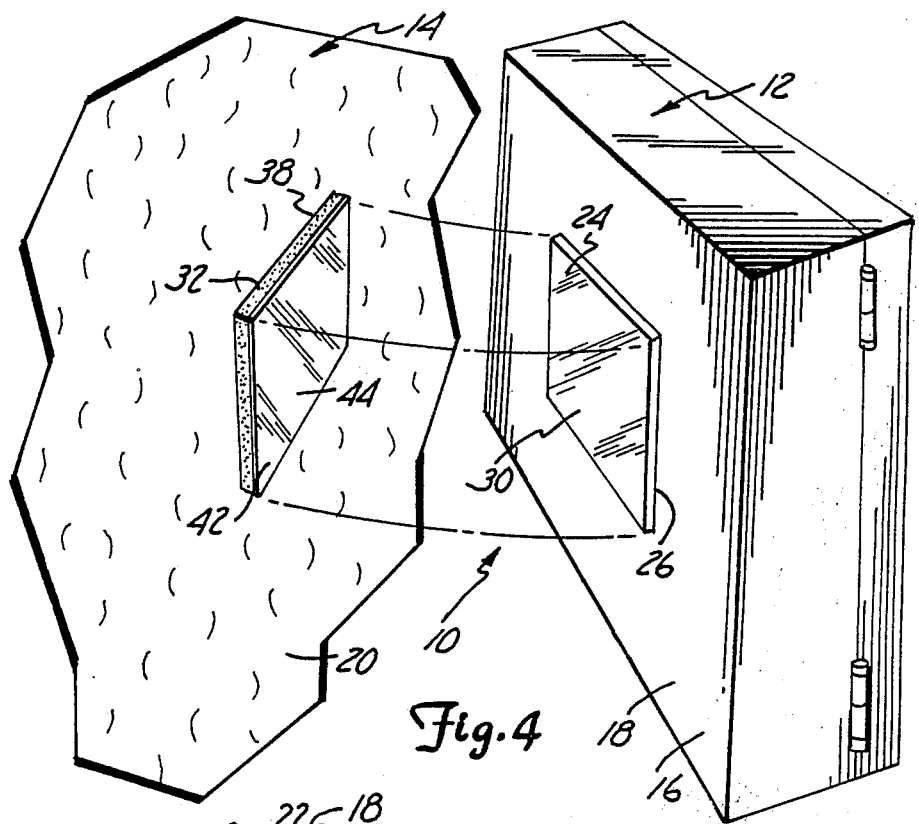
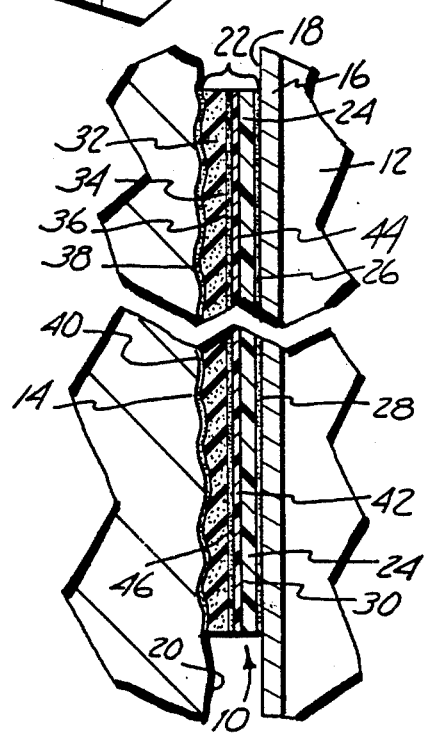
Fig. 4
Fig. 3

ADHESIVE HOLDING DEVICE WITH SEPARABLE ELEMENTS

BACKGROUND OF THE INVENTION

1. Field of the Invention

This invention has relation to an adhesive holding device which can secure an object indefinitely to a non-smooth, wall-like supporting surface without the use of bolts, screws, epoxy glue or the like. Elements of the device can be easily and substantially instantaneously permanently separated from each other to detach the object from such supporting surface without having to disengage screws, nuts and bolts or the like and without having to risk damage to the wall and the secured object while prying the object loose from the grip of the usual "permanent" glues.

2. Description of Prior Art

To support objects such, for example, as emergency first-aid kits, wall-mounted shelves and cabinets, and the like, it is customary to use nails, screws, and nuts and bolts. Such objects can also be so supported using epoxy glues, and similar "permanent" adhesive materials. When these objects have to be moved to another location or removed permanently, screws, bolts and nuts, or nails have to be disengaged; or the bond between the wall and the object has to be broken, usually with damage to the object, to the wall, or to both.

Laminated, self-adhering holding devices such as those used for hanging pictures and other objects, for example, are well known, and several have been developed by the present inventor. Such devices are shown in his U.S. Patents including U.S. Pat. No. 3,098,272 granted to him on July 23, 1963; U.S. Pat. No. 3,241,795 granted Mar. 22, 1966; 3,325,083 granted June 13, 1967; U.S. Pat. No. 3,311,339 granted Mar. 28, 1967; U.S. Pat. No. 3,856,249 granted Dec. 24, 1974; U.S. Pat. No. 3,885,768 granted May 27, 1975; U.S. Pat. No. 4,003,538 granted Jan. 18, 1977; U.S. Pat. No. 4,310,137 granted Jan. 12, 1982; and U.S. Pat. No. 4,756,498 granted July 12, 1988. Applicant's U.S. Pat. No. 4,442,617 granted Apr. 17, 1984 appears not to be pertinent to the present invention.

Use of a construction including a resilient layer "for complete conformance and attachment to a supporting surface and to its irregularities . . . of a relatively rigid and inflexible construction" was earlier discovered by the present inventor and set out in his U.S. Pat. No. 4,003,538 at column 1, lines 6–12 and 52–58; column 2, lines 55–63. This same concept is set out in his U.S. Pat. No. 4,310,137 beginning at column 3, line 49, and ending at column 4, line 20. In order to obtain the advantages of this resilient layer as set out in his '538 patent, he then thought it necessary to cover both sides of the resilient layer with a layer of thin, nonstretchable material. He taught that the resilient core layer had to "be stabilized by the thin non-stretchable layer at each outer side thereof." See also independent claims 1, 6 and 7 of that patent. His patent '137 covered the use of two polyvinyl chloride (PVC) sheets, each with two adhesive surfaces, the PVC sheets being joined to an intermediate layer of tissue paper or other non-fusible or rupturable material. As a modification of this structure, he added a layer of "suitable foam material" which overlays the outward side of at least one of the layers of PVC. He disclosed a resilient layer of substantially the same thickness as that of either one of the PVC layers. The effect of this structure was "to provide a degree of yielding effect for intimate adherence to a textured surface." See the '137 patent, column 4, lines 10–17; claim 2; and FIG. 10.

What was not available before the present invention was a greatly simplified holding device which utilized a relatively thick resilient pad, bonded to a single sheet of thin, flexible, non-stretchable material to stabilize the resilient pad, and, at the same time, providing the smooth, polished, non-porous surface needed to bond with a similar surface of a single sheet of plastic laminate such as PVC.

SUMMARY OF THE INVENTION

An adhesive holding device for securing indefinitely a flat rigid wall of an object to a wall-like supporting surface which may not be smooth includes a plurality of laminates, two of which can be easily and quickly separated from each other to release the object from the wall without damage to either.

These laminates are situated in overlying relation with respect to each other and include a first sheet of plastic material partially defined by opposed outwardly facing and inwardly facing surfaces, the outwardly facing surface being covered by a pressure sensitive adhesive and the inwardly facing surface being a highly polished surface.

For brevity and clarity of language, as to all of the laminates, the outwardly facing surfaces ultimately facing away from the wall are hereafter referred to as outward surfaces, and the inwardly facing surfaces finally facing toward the wall are hereafter referred to as inward surfaces.

The holding device also includes a flat resilient, compressible, relatively thick pad partially defined by opposed nominally parallel outward and inward surfaces, each surface being covered with a pressure sensitive adhesive. Additionally, the device includes a second sheet of relatively thin, flexible, effectively non-stretchable material having a smooth and highly polished outward surface adhered to the inward side of the first sheet by mutual attraction and having an inward surface captured by the adhesive outward surface of the flexible pad.

BRIEF DESCRIPTION OF THE DRAWINGS

FIG. 3 is a fragmentary vertical sectional view taken on line 3—3 in FIG. 2 of a holding device of the present invention securing a portion of a back wall of an object to a portion of a non-smooth wall-like supporting surface;

FIG. 4 is an exploded view showing the holding device after two of its elements have been separated from each other to detach the object from the wall.

DESCRIPTION OF PREFERRED EMBODIMENT

Figure 1:
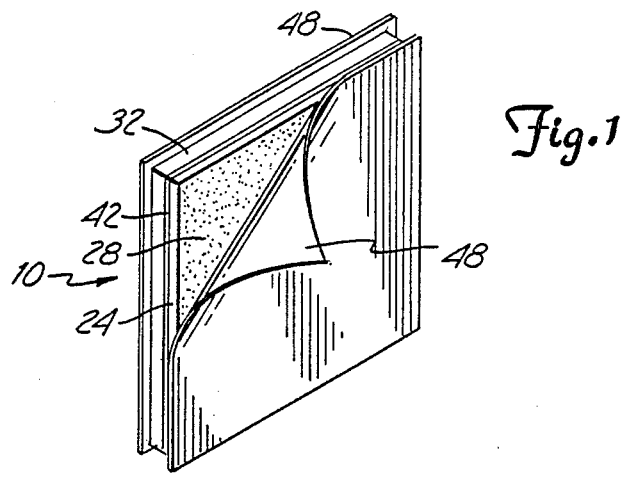
FIG. 1 is a perspective view of an adhesive holding device made according to the present invention.

An adhesive holding device 10 is for securing an object 12 to a non-smooth wall 14. As shown, the object 12 has a flat, rigid back wall 16 providing an inwardly facing flat, unyielding back surface 18.

Wall 14 is provided with a non-smooth outwardly facing surface 20. Examples of non-smooth wall surfaces where the adhesive holding device 10 will be especially effective include painted or unpainted wooden surfaces, painted or unpainted wallboard surfaces, surfaces covered with wallpaper, and surfaces of walls of any material covered with a textured or stucco-like finish. The holding device of the invention will also be effective in securing an object to a smooth wall such as a smooth, rigid steel wall, for example.

Adhesive holding device 10 includes a plurality of co-extensive laminates 22 overlying each other. These laminates include a first sheet of plastic material 24 partially defined by an outward surface 26 covered with a pressure sensitive adhesive layer 28 and an inward surface 30 which is parallel to the outward surface and is very smooth and polished.

The adhesive holding device 10 also includes a resilient, compressible, flat, relatively thick pad 32 partially defined by nominally parallel, outward and inward surfaces consisting of outward surface 34 covered with a pressure sensitive adhesive layer 36, and an inward surface 38 covered with a pressure sensitive adhesive layer 40.

A second sheet 42 of thin, flexible, effectively non-stretchable material is provided with an outward wall surface 44 which is adhered to the inward surface 30 of the first sheet 24. Surface 44 can be a clean, polished surface which is smooth and non-porous.

One method of achieving a smooth, non-porous highly polished inward surface 30 on the first sheet of plastic material 24 is to bond it to the smooth, non-porous surface 44 of the second sheet 42 under heat and pressure. This laminating process transfers the smooth, non-porous characteristics of the surface 44 to the surface 30 and insures an intimate contact between them which will be maintained indefinitely or until the laminates 24 and 42 are separated in a manner to be later described.

This mutual attraction of the outer wall surface 44 of the second sheet 42 to the inward surface 30 of the first sheet 24 is not fully understood. It is believed that at least some molecular attraction is involved; and it is clear that because of the smooth and polished nature of the surface 30 and the clean, polished or smooth, non-porous nature of the surface 44, a partial vacuum is also involved. This phenomenon of mutual attraction of such surfaces is discussed in my following U.S. Pat. No.: 3,098,272 at column 2, lines 17-30; U.S. Pat. No. 3,241,795 at column 2, lines 4-20; U.S. Pat. No. 3,325,083 at column 2, lines 38-45; and U.S. Pat. No. 4,003,538 at column 2, lines 38-45.

The bond between first sheet 24 and second sheet 42 is permanent in nature. That is to say, once this bond is established by putting the two sheets together under substantial pressure, the bond is not weakened with the passage of time as long as the forces exerted between them are largely in shear. However, this bond is non-tacky, and these two sheets 24 and 42 can be separated from each other by applying a steadily increasing force tending to separate them in a direction normal to the plane of the surfaces 30 and 44, in a manner to be described.

Second sheet 44 is also partially defined by an inward surface 46 which is captured by the layer of pressure sensitive adhesive material 36 to bond it permanently and securely to the outward surface 34 of the pad 32.

In the drawings, the "thickness" dimensions have been greatly exaggerated for clarity of illustration. Different materials can be used successfully over a range of different thicknesses. However, a first sheet of plastic material 24 approximately 0.020" thick and made of polyvinyl chloride (PVC), a relatively thin second sheet 42 of 0.004" thickness made of a polyester and a relatively thick resilient pad of 0.050" thickness made of expanded polyurethane, have been found to be most satisfactory for the purpose, for example. Many other materials could be used to make a suitable, relatively thick, resilient, compressible, flat pad such as that shown at 32.

For reasons not clearly understood, the holding power of the first sheet 24 and the second sheet 42 with respect to each other is greater when the second sheet 42 is thinner and is lesser when it is thicker. This has been determined by actual testing.

As clearly seen in FIG. 1, the adhesive material 28 on the outward surface 26 of the first sheet of plastic material 24 is covered with a non-adhering release sheet or protective cover strip 48. Also, the adhesive material 40 on the inward surface 38 of the resilient pad 32 (see FIG. 3) is covered by such a release sheet 48. These sheets 48 protect those surfaces 28 and 40 of adhesive materials until such time as the holding device 10 is being made ready for use.

Figure 2:
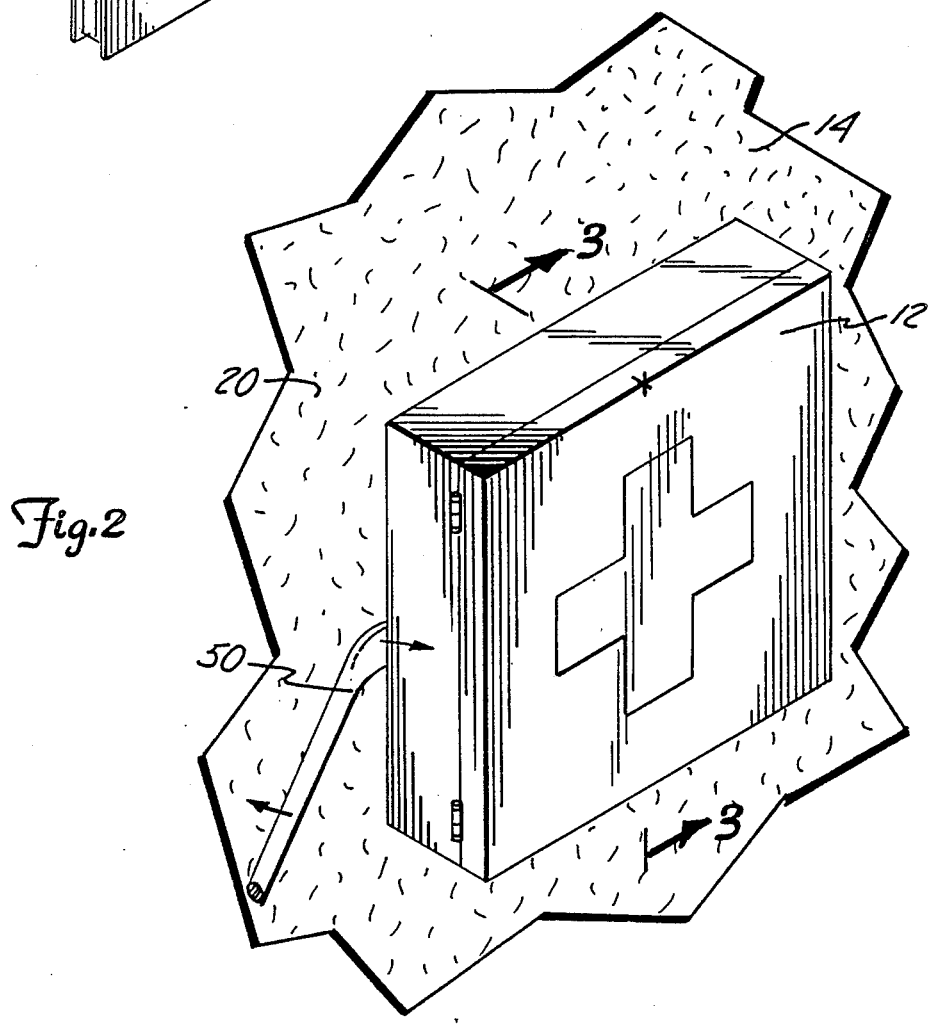
FIG. 2 is a perspective view of an object having a flat rigid back surface secured to a fragment of a vertical wall-like supporting surface utilizing the adhesive holding device of the invention, and showing a pry bar inserted between the back surface of the object and the supporting surface for the purpose of separating elements of the holding device from each other to detach the object from the wall.
Figure 5:
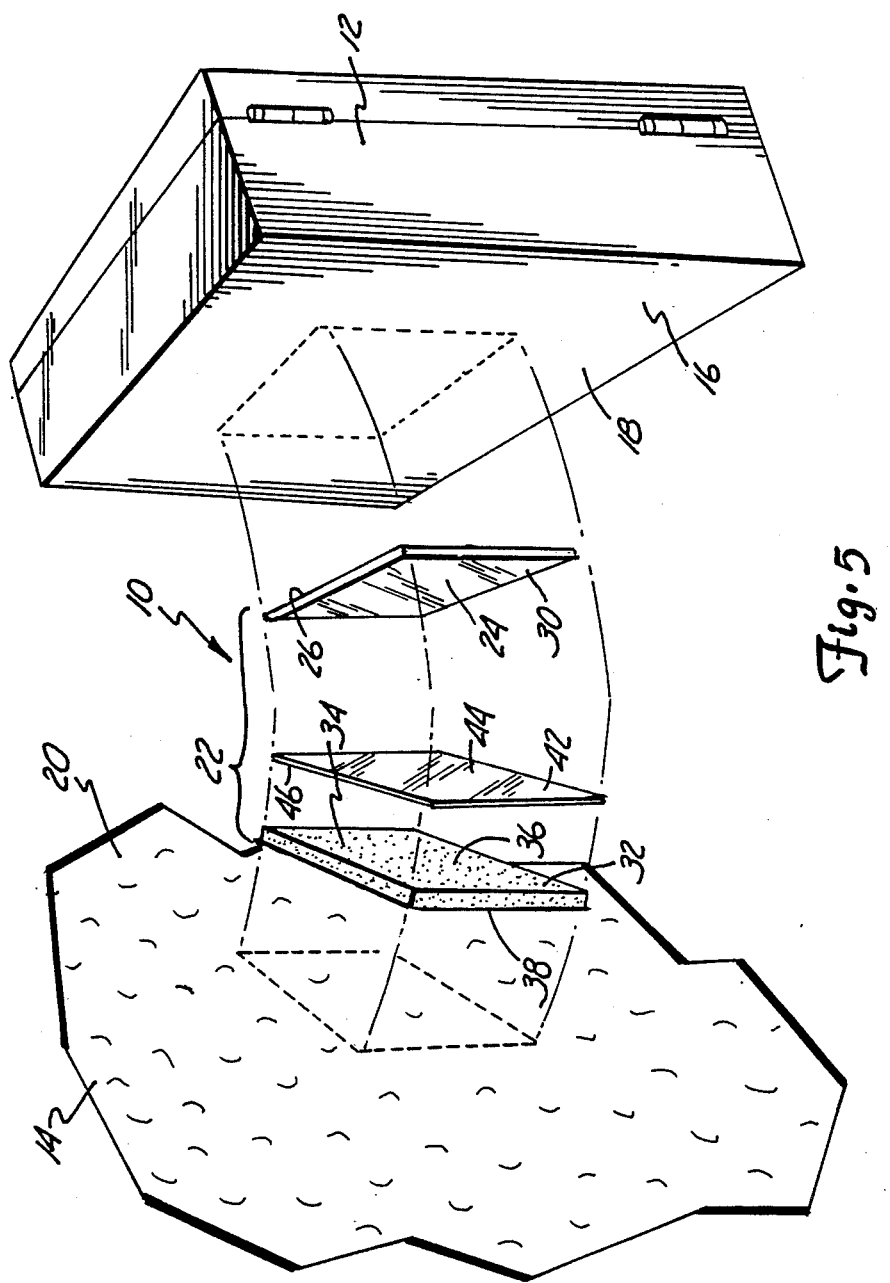
FIG. 5 is an exploded view of all of the laminates which make up the holding device in relative position to each other, to an object and to a wall-like surface to which the object is to be secured.

To secure an object 12 such, for example, as the emergency first-aid case shown in the drawing to a wall-supporting structure as the non-smooth wall 14, one or more adhesive holding devices 10 such as shown in FIG. 1 can be used. Typically, to support object 12 on wall 14 as seen in FIG. 2, four such devices can be used, one in each corner.

OPERATION

One by one, the non-adhering release sheet 48 will be removed from the adhesive layer 28 covering the outward surface 26 of the first sheet 24, and each device 10 will, in turn, be pressed against the back wall 16 to permanently secure each device 10 to the wall. All of the release sheets 48 covering the adhesive layer 40 on the inward surfaces 38 of the resilient pads 32 will then be removed, and the object 12 will be carefully positioned spaced just slightly from the wall 14. When the precisely desired position is obtained, the entire object 12 will be pushed back against the wall to adhere the resilient pad 32 permanently and intimately to the non-smooth surface 20 of the wall 14. There the object can remain indefinitely.

If and when it is desired to remove the object from the wall, a thin-bladed screwdriver, stout putty knife, other blade, such as on a pry bar 50 will be inserted between the back wall 16 of the object 12 and the surface 20 of the wall-like structure 14. The blade used, in the drawings as shown, is the leading edge of the pry bar. This edge should be at least as thin as the thickness of the installed adhesive holding devices without their release sheets 48 attached. With this leading blade edge of the pry bar positioned as seen in FIG. 2, the pry bar is forced toward the wall 14 in the direction of the arrow, and manual pressure is exerted steadily and increasingly to force the object 12 and the first sheet 24 away from the wall 14, the resilient pad 32 and the second sheet 42, the force being exerted substantially in direction normal to the mutually adhered smooth surfaces of the first and second sheets. When the internal forces holding these sheets together is overcome, initially toward the side edge of the object to the left as seen in FIG. 2, sheets and 2 will separate, first in the vicinity of the pry bar to the left as seen in FIG. 2. Then, progressively, and substantially instantaneously, the first and second sheets of the holding device(s) will separate. Once separation begins, it happens progressively so fast that it can be said that the first sheet "pops" off of the second sheet or that the object "pops" off of the wall. This is because, as the force of the pry bar is exerted, the inner molecular attraction, and/or other attraction, of the two sheets for each other is causing resistance to separation over the entire area of the contact between the two sheets. Since the maximum stress is coming to the left as seen in FIG. 2, the initial separation will be along that edge; but because the entire area of mutual attachment of the two sheets is resisting separation, once the separation begins to at the left area, the "overload" travels substantially instantaneously across the entire area of separation, thus resulting in the "popping" action.

Although the present invention has been described with reference to preferred embodiments, workers skilled in the art will recognize that changes may be made in form and detail without departing from the spirit and scope of the invention.

What is claimed is:

1. An adhesive holding device with separable elements for securing a flat, rogid, back surface of an object to a wall supporting structure which may not be smooth, wherein said holding device includes:
   (a) a plurality of coextensive laminates overlying each other;
   (b) the laminates including:
      (1) a first sheet of plastic material partially defined by opposed, parallel outward and inward surfaces, the outward surface being covered with a pressure sensitive adhesive material adapted to be affixed to the back surface of an object to be secured, and the inward surface being smooth and polished, and of a nature to adhere naturally to another smooth, polished surface,
      (2) a relatively thick, resilient, compressible, flat pad partially defined by opposed, nominally parallel, outward and inward surfaces, each such surface being covered with a pressure sensitive adhesive, wherein the inward surface is adapted to be affixed to a surface of a wall supporting structure, and
      (3) a second sheet of relatively thin, flexible, effectively non-stretchable material having a smooth and polished outward surface adhered to the inward surface of the first sheet by mutual attraction and having an inward surface captured by the adhesive covering the outward surface of the resilient pad.

2. The adhesive holding device of claim 1 wherein:
   (c) the inward surface of the resilient pad and the outward surface of the first sheet are each protected with a non-adhering release sheet prior to the time that the holding device is put into use.

3. The holding device of claim 1 wherein:
   (c) the first sheet is formed of a polyvinyl chloride material.

4. The holding device of claim 1 wherein:
   (c) the second sheet is formed of a polyester material.

5. The holding device of claim 4 wherein:
   (d) the first sheet is formed of a polyvinyl chloride material.

6. The holding device of claim 1 wherein:
   (c) the first sheet has a thickness of not over 0.020 inches;
   (d) the resilient pad has a thickness of not less than 0.050 inches; and
   (e) the second sheet has a thickness of not more than 0.006 inches.

7. An adhesive holding device with separable elements for securing a rigid wall surface of an object to the surface a wall supporting structure which is generally congruent to teh object wall surface and which may not be smooth, wherein said holding device includes:
   (a) a plurality of coextensive laminates overlying each other;
   (b) the laminates including:
      (1) a first sheet of plastic material partially defined by opposed, parallel outward and inward surfaces, the outward surface being covered with a pressure sensitive adhesive material adapted to be affixed to a wall surface of an object to be secured, and the inward surface being smooth and polished, and of a nature to adhere naturally to another smooth, polished surface,
      (2) a relatively thick, resilient, compressible pad partially defined by opposed, nominally parallel, outward and inward surfaces, each such surface being covered with a pressure sensitive adhesive, wherein the inward surface is adapted to be affixed to a surface of a wall supporting structure, and
      (3) a second sheet of relatively thin, flexible, effectively non-stretchable material having a smooth and polished outward surface adhered to the inward surface of the first sheet by mutual attraction and having an inward surface captured by the adhesive covering the outward surface of the resilient pad.

8. The adhesive holding device of claim 7
   (c) the inward surface of the resilient pad and the outward surface of the first sheet are each protected with a non-adhering release sheet prior to the time that the holding device is put into use.

9. The holding device of claim 7 wherein:
   (c) the first sheet is formed of a polyvinyl chloride material.

10. The holding device of claim 7 wherein:
    (c) the second sheet is formed of a polyester material.

11. The holding device of claim 10 wherein:
    (d) the first sheet is formed of a polyvinyl chloride material.

12. The holding device of claim 7 wherein:
    (c) the first sheet has a thickness of not over 0.020 inches;
    (d) the resilient pad has a thickness of not less than 0.050 inches; and
    (e) the second sheet has a thickness of not more than 0.006 inches.

* * * * *

UNITED STATES PATENT AND TRADEMARK OFFICE
CERTIFICATE OF CORRECTION

PATENT NO. : 4,942,071
DATED : July 17, 1990
INVENTOR(S) : Bruce J. Frye

It is certified that error appears in the above-identified patent and that said Letters Patent is hereby corrected as shown below:

Col. 5, line 34, delete "rogid,", insert --rigid,--
Col. 6, line 19, delete "teh", insert --the--

Signed and Sealed this

Twenty-seventh Day of August, 1991

Attest:

HARRY F. MANBECK, JR.

Attesting Officer

Commissioner of Patents and Trademarks